United States Patent [19]
Huang

[11] Patent Number: 5,638,867
[45] Date of Patent: Jun. 17, 1997

[54] FLUIDIC OSCILLATOR HAVING A WIDE RANGE OF FLOW RATES, AND A FLUID METER INCLUDING SUCH AN OSCILLATOR

[75] Inventor: Bao Tuan Huang, Antony, France

[73] Assignee: Schlumberger Industries, S.A., Montrouge, France

[21] Appl. No.: 569,232
[22] PCT Filed: Jul. 6, 1994
[86] PCT No.: PCT/FR94/00831
  § 371 Date: Jan. 11, 1996
  § 102(e) Date: Jan. 11, 1996
[87] PCT Pub. No.: WO95/02803
  PCT Pub. Date: Jan. 26, 1995

[30] Foreign Application Priority Data

Jul. 13, 1993 [FR] France ........................ 93 08592

[51] Int. Cl.[6] .................................................. G01F 1/20
[52] U.S. Cl. .............................. 137/826; 137/842
[58] Field of Search ............................ 137/826, 842

[56] References Cited

U.S. PATENT DOCUMENTS

| | | | |
|---|---|---|---|
| 4,854,176 | 8/1989 | Okabayashi | 137/826 |
| 5,181,660 | 1/1993 | Stouffer et al. | 137/826 |
| 5,363,704 | 11/1994 | Huang | 137/826 |

*Primary Examiner*—A. Michael Chambers
*Attorney, Agent, or Firm*—Leonard W. Pojunas

[57] ABSTRACT

The invention provides a fluidic oscillator which is symmetrical about a longitudinal plane of symmetry (P), the oscillator comprising means for generating an oscillating two-dimensional fluid jet, an obstacle provided in its front portion with a cavity that is swept by the oscillating jet, and a longitudinal element disposed in the empty space situated downstream from said obstacle in such a manner as to partially subdivide said space into two identical zones, and to form between them at least one communication channel for the fluid. The invention also provides a fluid flow meter including such a fluidic oscillator.

15 Claims, 8 Drawing Sheets

*FIG.1*

Prior Art

FLUIDIC OSCILLATOR HAVING A WIDE RANGE OF FLOW RATES, AND A FLUID METER INCLUDING SUCH AN OSCILLATOR

The present invention relates to a fluidic oscillator and to a flow meter for a fluid, a liquid or a gas, the meter including such a fluidic oscillator.

For several years now, meters have appeared on the market that include fluidic oscillators and that differ from conventional meters having a spinner or a membrane by the fact that they operate without using any moving parts that could wear over time. Such fluidic oscillators may be of small dimensions, and of very simple architecture, and they present very good reliability. In addition, such oscillators deliver a frequency signal which is easily converted into a digital signal, and that is particularly advantageous for reading meters remotely.

A fluidic oscillator that is symmetrical about a longitudinal plane of symmetry is described in French patent application No. 92 05 301 filed by the Applicant, and it includes a fluid inlet provided with an inlet opening of width d. Such an inlet opening enables an oscillating two-dimensional fluid jet to be formed. The fluidic oscillator includes an "oscillation" chamber in which the two-dimension fluid jet can oscillate. The oscillation chamber has walls situated on either side of the longitudinal plane of symmetry and it is connected via a first end to the fluid inlet opening, and via a second end, remote from the first, to a fluid outlet opening. The fluid inlet and outlet openings are both in alignment on the longitudinal plane of symmetry. The fluidic oscillator also includes an obstacle housed in the oscillation chamber, thus co-operating with the walls thereof to form lateral passages that are symmetrical about the longitudinal plane of symmetry so as to enable the fluid to flow towards the downstream end of the fluidic oscillator. The obstacle possesses a front portion and a rear portion, the front portion being provided with a cavity disposed facing the fluid inlet opening. The rear portion is situated facing the fluid outlet opening and it possesses an end which co-operates with said fluid outlet opening to define an empty space into which there open out the passages for allowing the fluid to flow towards the downstream end of the fluidic oscillator.

Thus, the fluid jet penetrates into the oscillation chamber via the inlet opening and it sweeps over the walls of the cavity, thereby having the effect of forming eddies on either side of said fluid jet and facing the front portion, which eddies alternate between being strong and weak, in antiphase with the oscillation of the jet.

Flow rate is measured, for example, by detecting when the bottom of the cavity is swept over by the jet as it oscillates, with the frequency of oscillation of the jet being proportional to the flow rate of the fluid.

Fluid flow is thus exhausted towards the downstream end of the fluidic oscillator in alternation, i.e., more precisely, it passes towards the empty space and the outlet opening alternately via each of the passages disposed on either side of the obstacle.

A factor K is then defined which is equal to the ratio of frequency of oscillation of the jet to the fluid flow rate Q, and it is assumed, for example, that a fluidic oscillator used in a commercial gas meter is linear over a range of flow rates extending from 0.6 m3/h to 40 m3/h so long as relative variations in its factor K are smaller than ±1.5%.

Figure 1:
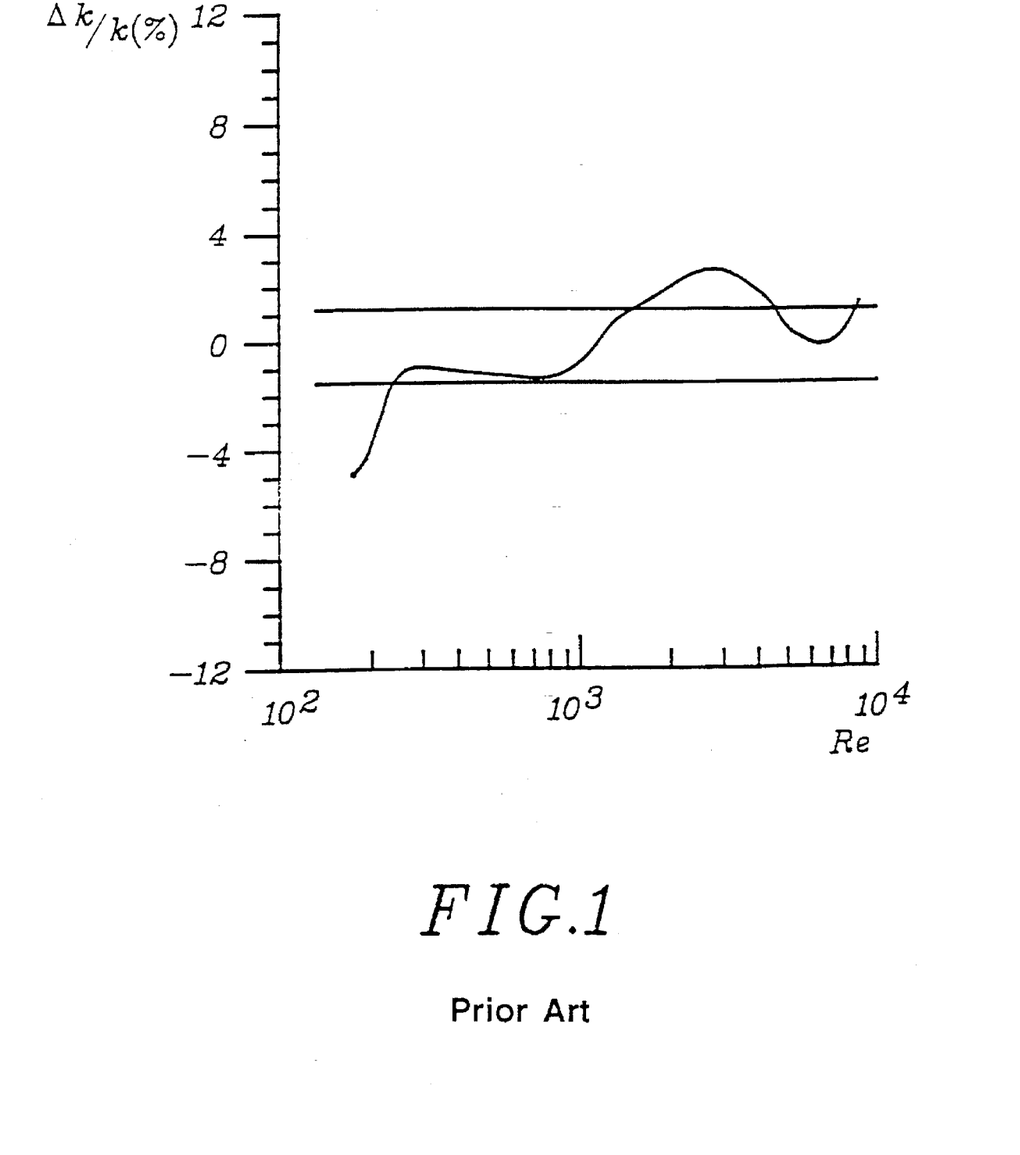
FIG. 1 is described above and shows relative variation in the factor K as a function of the Reynolds number Re for a fluidic oscillator of the prior art.

For any given fluidic oscillator, its linearity is determined, as shown in FIG. 1, from a "calibration" curve of relative variations in its factor K as a function of Reynolds number Re (where Re is equal to the speed of the fluid at the inlet opening of the oscillation chamber multiplied by the width of said opening and divided by the dynamic viscosity of said fluid).

FIG. 1 shows that from a certain value of Reynolds number Re, the calibration curve no longer lies within a range corresponding to relative variation in the factor K of less than ±1.5%, which means that the fluidic oscillation in question is considered as being non-linear.

On each half-period of the oscillating phenomenon, the fluid flow that has taken one of the side channels opens out into the empty space and goes towards the exhaust duct.

Unfortunately, the fluid flow creates an increase of pressure in the other passage and this increase propagates upstream towards the eddies, thereby disturbing the oscillation of said eddies and thus the oscillation of the jet. This explains the error observed in the calibration curve of FIG. 1 and shows the influence of the downstream flow of fluid on the linearity of the fluidic oscillator. This influence increases with increasing Reynolds number. The present invention seeks to remedy this drawback by proposing a fluidic oscillator and a fluid meter including such a fluidic oscillator that are of particularly simple design and in which linearity is improved, particularly at high fluid flow rates.

The present invention thus provides a fluidic oscillator which is symmetrical about a longitudinal plane of symmetry P, and which comprises: means for generating a two-dimensional fluid jet that oscillates transversely relative to said longitudinal plane of symmetry P; and means for forming eddies on either side of said jet, and for enabling the fluid to flow towards the downstream end of the fluidic oscillator, said eddies being influenced by the downstream flow of the fluid.

According to the invention, the fluidic oscillator includes means for limiting the influence of the downstream flow of the fluid on the oscillation of the eddies.

More particularly, the invention provides a fluidic oscillator which comprises:

a fluid inlet having an inlet opening of width d suitable for forming an oscillating two-dimensional fluid jet;

an oscillation chamber connected via one of its ends to the fluid inlet opening and via its opposite end to a fluid outlet opening, the two openings being in alignment on the longitudinal plane of symmetry P, and having walls situated on either side of said plane P;

an obstacle disposed in said oscillating chamber and co-operating with the walls thereof to form passages to allow the fluid to flow towards the downstream end of the fluidic oscillator, said obstacle having a front portion in which a cavity is formed facing the fluid inlet opening, and a rear portion disposed facing the fluid outlet opening and having a rear end that co-operates with said fluid outlet opening to define an empty space into which said passages open out.

The means for limiting the influence of the downstream flow of the fluid on the oscillation of the eddies comprise a longitudinal element disposed in line with the openings and at least in part in the empty space in such a manner as to partially subdivide it into two identical zones, forming between said zones at least one communication channel for the fluid, said communication channel having a middle flow section lying in the longitudinal plane of symmetry P.

Advantageously, the longitudinal element has an "upstream" end and an opposite "downstream" situated at a distance from the fluid inlet opening lying in the range 8.5 d to 16.2 d. In a first embodiment of the invention, the communication channel is formed between the end of the rear portion of the obstacle and the upstream end of the longitudinal element, said ends constituting the edges of said communication channel.

According to other characteristics of the invention:

the longitudinal element is generally T-shaped with the horizontal bar of the T constituting one of the edges of the communication channel;

the longitudinal element is of a shape having lateral faces extending from the upstream end to the downstream end, each forming the same continuously decreasing angle with the longitudinal plane of symmetry P; and the longitudinal element is triangular in shape with the tip of the triangle constituting the downstream end.

In this embodiment of the invention, the flow section of the communication channel is substantially rectangular in shape in a direction perpendicular to the flow direction.

In a second embodiment of the invention, the longitudinal element forms a partition extending from its upstream end which coincides with the downstream end of the rear portion of the obstacle to its own downstream end, the communication channel being formed through said partition.

According to other characteristic associated with this embodiment:

the communication channel has a flow section that is substantially rectangular in shape, extending perpendicularly to the flow direction of the fluid;

the communication channel has a flow section that is substantially elliptical in shape, extending perpendicularly to the flow direction of the fluid; and the communication channel has a flow section that is substantially oblong in shape, extending perpendicularly to the flow direction of the fluid.

According to yet other characteristics of the invention:

the communication channel has a longitudinal dimension corresponding to its width and lying in the range 0.5 d to 5 d;

the distance between the fluid inlet opening and the middle transverse plane of the communication channel lies in the range 7.5 d to 15 d; and the communication channel has a transverse dimension lying in the range 0.5 d to 5 d.

The invention also provides a flow meter for a fluid, a liquid or a gas, the meter including a fluidic oscillator complying with at least one of the above-specified characteristics.

Other characteristics and advantages of the invention appear from the following description given by way of non-limiting illustration, and made with reference to the accompanying drawings, in which.

As shown in FIGS. 2 to 10 and as given overall reference 1, a fluidic oscillator of the invention posses a longitudinal plane of symmetry P. The fluid flowing through this fluidic oscillator is a gas, but it could equally well be a liquid.

Figure 2:
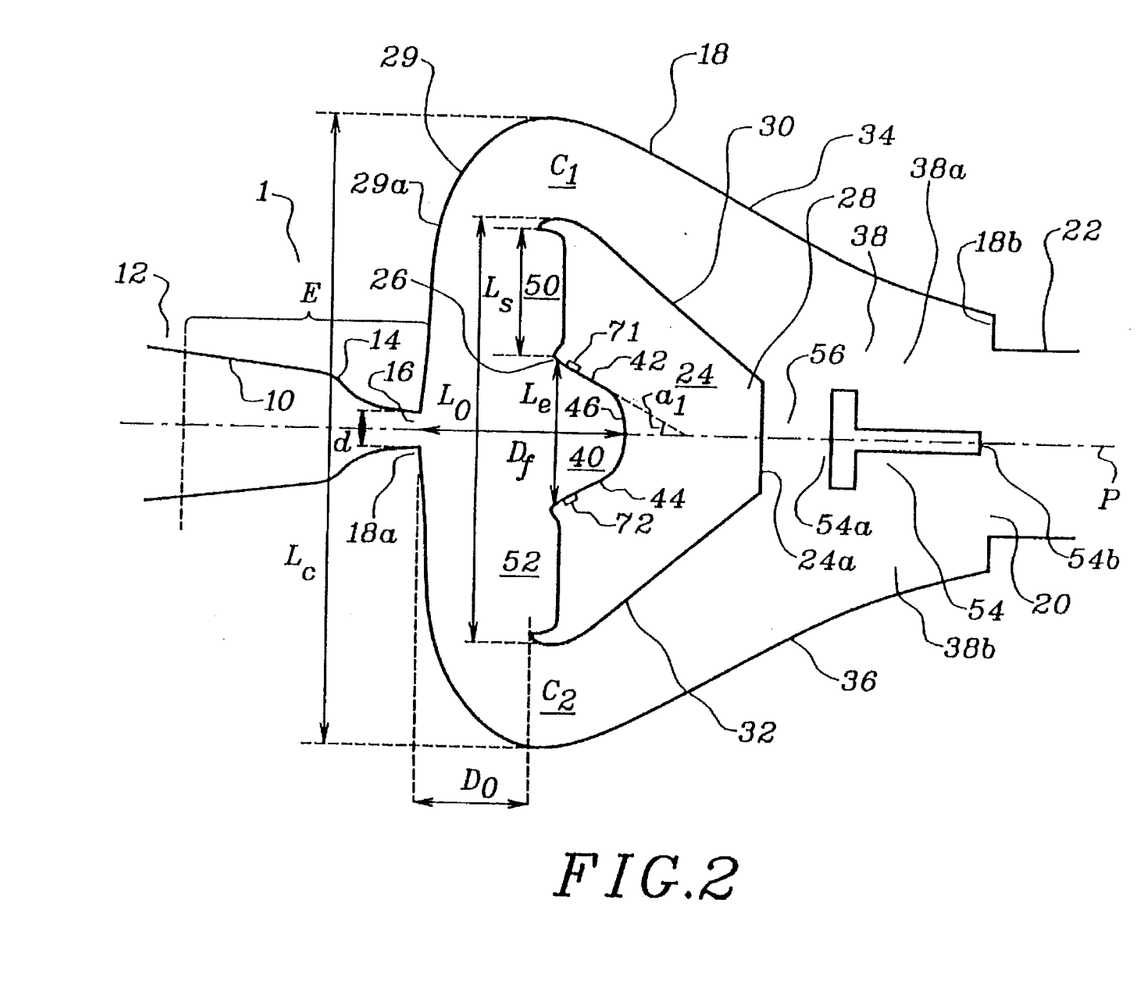
FIG. 2 is a diagrammatic plan view of a fluidic oscillator constituting a first embodiment of the invention.

Thus, as shown in FIG. 2, the fluid penetrates into the fluidic oscillator via an inlet E constituted by a settling chamber 10 connected to a fluid inlet duct 12 and by a converging portion 14 that terminates in a rectangular inlet opening 16. The converging portion 14 serves to increase the speed of the fluid and also has the function of forming an oscillating two-dimensional jet. To this end, the inlet opening 16 which is connected to one of the ends 18a of an oscillation chamber 18 is in the form of a rectangle of height h (see FIG. 3) and of width d, with the ratio of these two dimensions satisfying the conditions for a flow to be two-dimensional, as known to the person skilled in the art. In general, the ratio h/d must be about 6 or must even be greater than 6.

The width d constitutes the reference unit in the description below, and given that the flow phenomena are two-dimensional, the various component elements of the fluidic oscillator of the present invention are described merely in a plane parallel to the plane of oscillation of the fluid jet.

The oscillation chamber 18 into which the oscillating two-dimensional fluid jet penetrates is connected to a fluid outlet opening 20 via its end 18b opposite from its end 18a which is connected to the fluid inlet opening 16. The fluid outlet opening 20 corresponds to the inlet opening of a fluid exhaust duct 22.

As shown in FIG. 2, the fluid inlet and outlet openings 16 and 20 are in alignment on the longitudinal plane of symmetry P, and the oscillation chamber 18 is symmetrical about said plane. An obstacle 24 that is symmetrical about the longitudinal plane of symmetry P is disposed in the oscillation chamber 18 and it presents firstly a front portion 26 situated at a distance D0 from the fluid inlet opening 16 lying in the range 1 d to 10 d, e.g. 2.5 d, and secondly a rear portion 28 situated facing the fluid outlet opening 20, with these two portions being substantially perpendicular to said longitudinal plane of symmetry P. The front portion 26 of the obstacle 24 possesses a width L0 lying in a range 5 d to 30 d. For example this width may be equal to 12 d.

The oscillation chamber 18 has a maximum width Lc in which the front portion 26 of the obstacle is located. Lc may lie in the range 10 d to 50 d. For example, Lc may be equal to 20 d.

In FIG. 2, there can be seen two symmetrical fluid flow passages C1 and C2 disposed on either side of the longitudinal plane of symmetry P. The passage C1 lying above the longitudinal plane of symmetry P in FIG. 2 comprises a first long portion between the front portion 26 of the obstacle 24 and a portion 29a of a "front" wall 29 of the oscillation chamber 18, and a second long portion between one (30) of the side walls 30 and 32 of the obstacle 24 and one (34) of the sides 34 and 36 of said oscillation chamber. The passage C2 situated beneath the longitudinal plane of symmetry P in the FIG. 2 has a first long portion between the front portion 26 of the obstacle 24 and a portion 29b of the front wall 29 of the oscillating chamber 18, and a second long portion between the other side wall 32 of the obstacle 24 and the other side wall 36 of the oscillation chamber.

These passages C1 and C2 open out into an empty space 38 situated downstream from the obstacle 24 in the fluid flow direction and defined between the end 24a of the rear portion 28 of the obstacle 24 and the fluid outlet opening 20. The width of these passages is substantially equal to the difference Lc–Lo.

A "main" cavity 40 is formed in the front portion 26 of the obstacle 24 facing the inlet opening 16. This main cavity 40 has an inlet of width Le lying in the range 2 d to 20 d, e.g. 5 d, and it possesses sloping walls 42 and 44 that substantially form a V-shape whose arms flare towards the outside of the cavity 40. These walls 42 and 44 present an aperture angle a1 relative to the plane of symmetry P lying in the range 0° to 80°. Advantageously, a1 lies in a range 10° to 45°. It may be equal to 45°, for example.

As shown in FIG. 2, the side walls 42 and 44 of the main cavity 40 unite via a substantially parabolic end 46. The end of the main cavity 40 is disposed facing the inlet opening 16 at a distance Df therefrom, where Df lies in the range 3 d to 15 d. Df may be equal to 6 d, for example.

The jet that has penetrated into the oscillation chamber 18 strikes the walls and the end of the main cavity 40 with alternating sweeping motion. The oscillation of the two-dimensional jet in the oscillation chamber 18 is accompanied by the formation of eddies situated on either side of the jet, which eddies alternate between being strong and weak in phase opposition to the oscillation. These eddies are located mainly in the space situated between the front portion 26 of the obstacle 24 and the portions 29a and 29b of the "front" wall 29 of the chamber 18 into which the inlet opening 16 leads.

In FIG. 2, two "secondary" cavities 50 and 52 are formed in the front portion 26 of the obstacle 24 symmetrically about the plane of symmetry P and on either side of the main cavity 40. The secondary cavities 50 and 52 are respectively situated facing the portions 29a and 29b of the front wall 29 of the oscillation chamber 18. The shape of the secondary cavities 50 and 52 is contained within a quadrilateral having one side open to form an inlet. The shape of the secondary cavities is thus tangential to the three sides of the quadrilateral.

The slopes of the side walls relative to a plane parallel to the plane of symmetry P may have large angular values without the operation of the device being greatly altered.

In FIG. 2, the end walls of the secondary cavities 50 and 52 are perpendicular to the plane of symmetry P, but they could also have an aperture angle relative to said plane, which angle could take any value up to ±45°. The inlet of each secondary cavity has a width Ls lying in a range 1 d to 15 d, and is equal to 3.75 d, for example.

The function of these secondary cavities 50 and 52 is to make the radial extent of the eddies depend on the flow conditions of the jet. The term "radial extent" is used to mean the distance between the center of the eddy in question and its perimeter. Such cavities may be of various different shapes while still performing this function.

Under turbulent conditions, and regardless of the position of the impact of the fluid jet in the main cavity 40, a secondary eddy is formed in each secondary cavity 50 and 52. These secondary eddies are sufficiently intense for the fluidic oscillator to operate overall in the same manner as an oscillator that does not have any secondary cavities.

Figure 11:
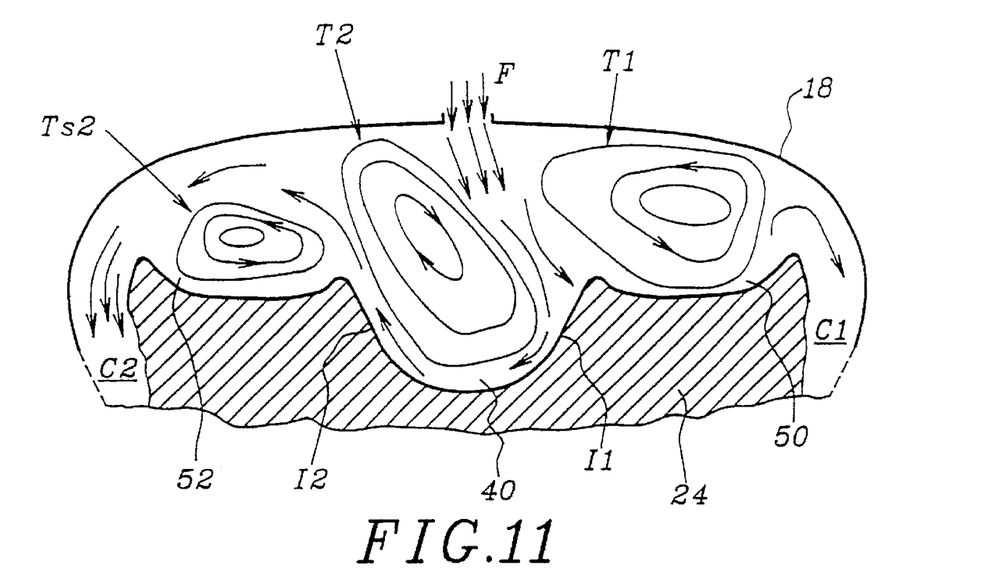
FIGS. 11 and 12 are fragmentary diagrammatic plan views of the front portion of the fluidic oscillator of the invention operating under transition conditions and shown at different instants.
Figure 12:
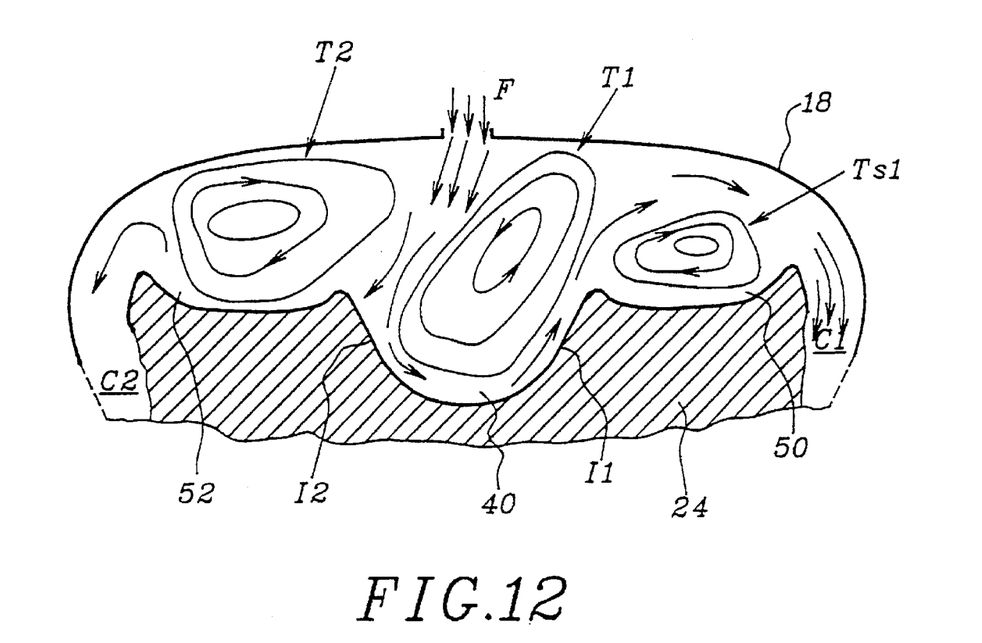

The secondary cavities 50 and 52 are particularly useful under laminar conditions and under transition conditions where they serve to improve the linearity of the fluidic oscillator. Thus, under transition conditions, as shown in FIGS. 11 and 12, the impact of the fluid jet F sweeps the main cavity 26 between its end points I1 and I2, and the oscillation is accompanied by the formation of main eddies T1 and T2 that are located between the front portion of the obstacle 24 and the front wall 29 of the oscillation chamber 18. In FIG. 11, the impact of the jet reaches the point I1 and the eddy T1 is then concentrated and strong while the eddy T2 is weak. The fluid jet escapes downstream from the obstacle 24 towards the empty space 38 mainly via the passage C2.

Under turbulent conditions, both secondary cavities 50 and 52 are filled with secondary eddies Ts1 and Ts2 that are alternately strong and weak in phase opposition to the main eddies. However, the more the flow rate falls off, the more the intensity or the concentration of these secondary eddies decreases. As a result, the stronger main eddy, in FIG. 11 the eddy T1, increases in radial extent such that when the flow rate decreases, it progressively fills up the secondary cavity 50 to the detriment of the secondary eddy Ts1 which ends up by disappearing completely. In contrast, the secondary eddy Ts2 created by the fluid jet escaping continues to be present in the secondary cavity 52.

In FIG. 12, the impact of the fluid jet is situated at I2. In this case it is the eddy T2 that has increased in radial extent, with the secondary eddy Ts2 disappearing completely when the flow rate is small enough. When they are concentrated and strong, the main eddies have a greater radial extent under transition conditions than they do under turbulent conditions (since under turbulent conditions both secondary cavities are occupied by secondary eddies, so less space is available for the main eddies to develop). The oscillation frequency decreases with increasing radial extent of the strong main eddies.

However, at each half-period of the oscillating phenomenon, and under all flow conditions, after flowing along one of the flow passages C1 or C2, the fluid flows to the downstream of the obstacle 24 into the empty space 38 where it sets up an increase of pressure in the other passage, which pressure increase propagates towards the upstream end of the oscillation chamber 18 where it influences the oscillation of the eddies.

This influence becomes more pronounced with increasingly turbulent flow conditions. To this end, the fluidic oscillator 1 of the invention includes means for limiting the influence of the downstream flow of the fluid on the oscillation of the eddies. The Applicant has also observed that this influence must not be eliminated completely.

Figure 6:
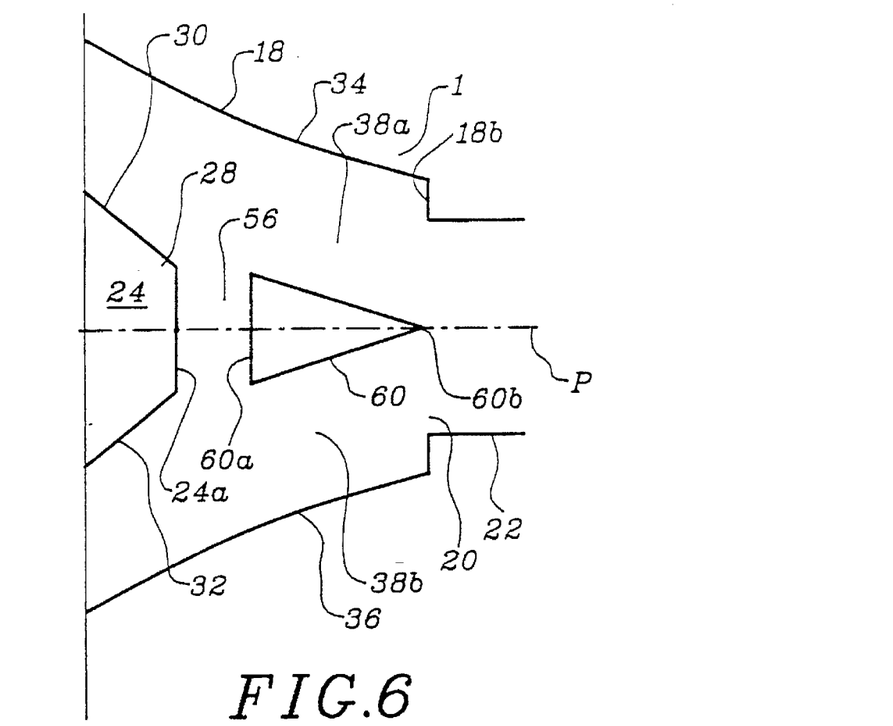
FIG. 6 is a fragmentary diagrammatic plan view showing another variant embodiment of the rear portion of the FIG. 2 fluidic oscillator.
Figure 7:
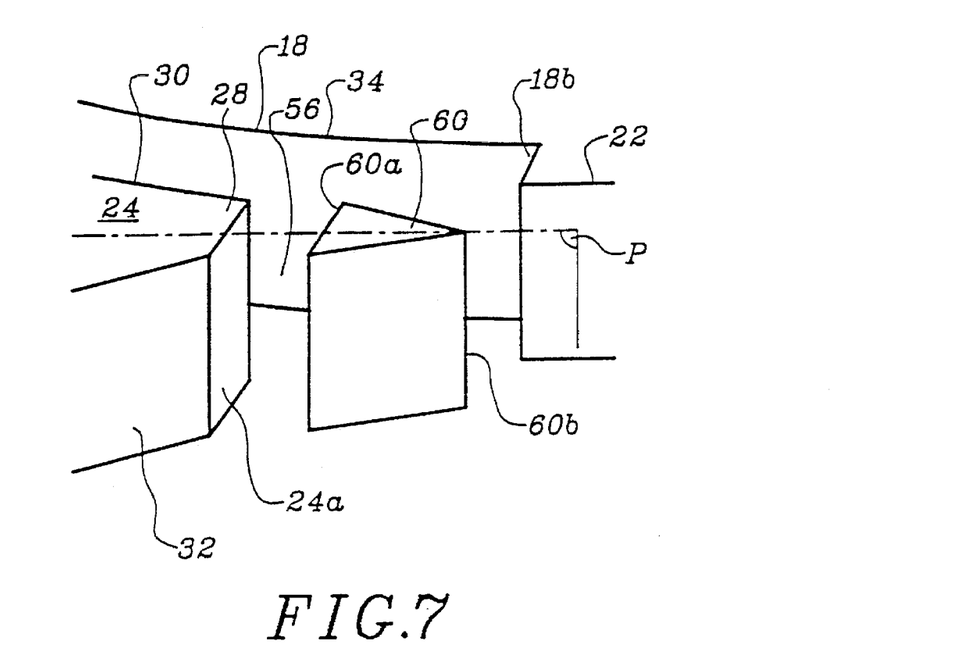
FIG. 7 is a diagrammatic perspective view of the FIG. 6 variant embodiment.
Figure 8:
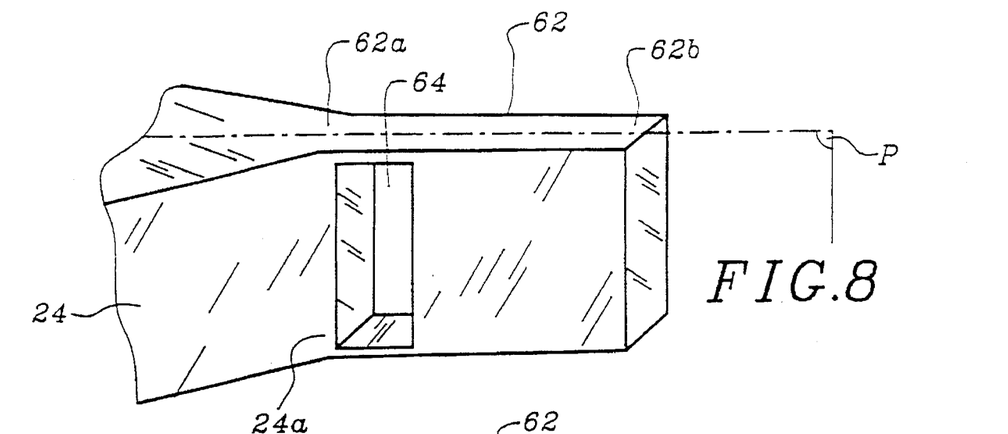
FIG. 8 is a fragmentary diagrammatic perspective view of the rear portion of a fluidic oscillator constituting a second embodiment of the invention, the front portion of said fluidic oscillator being identical to that of FIG. 2.
Figure 9:
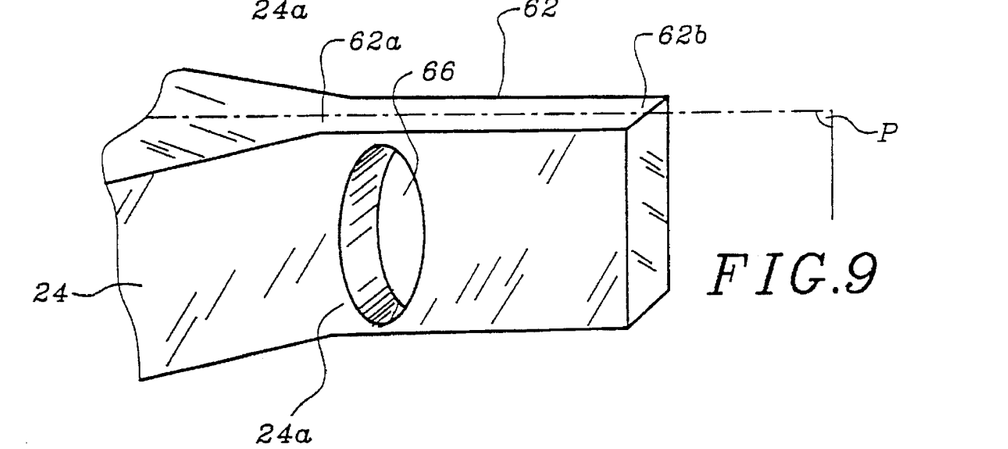
FIGS. 9 and 10 are fragmentary diagrammatic views in perspective showing variant embodiments of the rear portion of the fluidic oscillator of FIG. 8.
Figure 10:
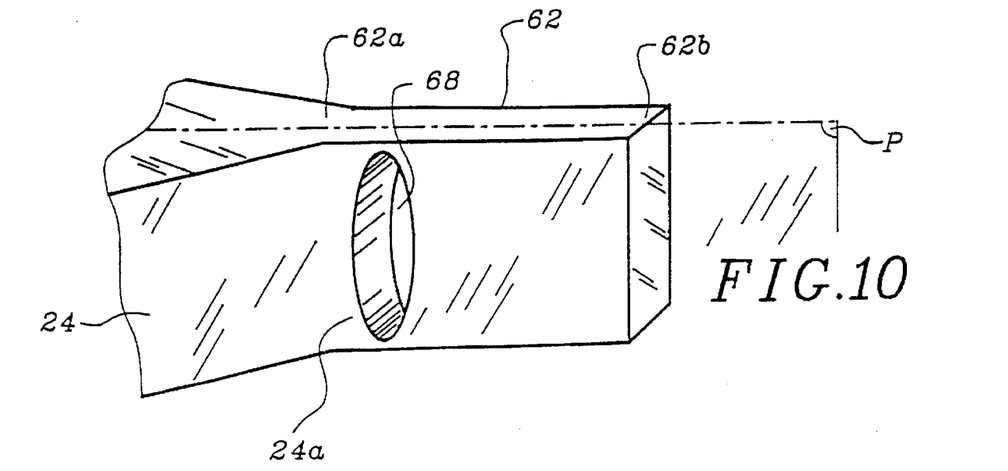

These means comprises a longitudinal element given references 54, 58, and 60 in FIGS. 2 to 7, and reference 62 in FIGS. 8 to 10, which longitudinal elements is disposed in line with the fluid inlet and outlet openings 16 and 20 and is symmetrical about the plane of symmetry P. The longitudinal element 54, 58, 60, and 62 is situated at least in part in the empty space 38, i.e. it could in theory be partially engaged in the fluidic exhaust duct 22. Nevertheless, it is particularly advantageous to limit its positioning to the oscillation chamber 18, given that a fluid meter including such an oscillator forms a compact unit that is easily installed between the fluid inlet and outlet ducts 12 and 22.

The longitudinal element 54, 58, 60, and 62 partially subdivides the empty space into two identical zones 38a and 38b situated on either side of the longitudinal side of symmetry P and into each of which there opens one of the passages C1 and C2. The means for limiting the influence of the downstream flow of the fluid on the oscillation of the eddies also comprise a communication channel given reference 56 in FIGS. 2 to 7, and references 64, 66, and 68 in FIGS. 8 to 10, which channel is formed between the zones 38a and 38b of the empty space 38, it also being possible to envisage a plurality of communication channels. Such a communication channel 56, 64, 66, and 68 has a middle flow section for the fluid that is contained in the longitudinal plane of symmetry P.

The longitudinal element 54, 58, 60, or 62 has two opposite ends 54a and 54b, 58a and 58b, 60a and 60b, or 62a and 62b that are in alignment on the plane of symmetry P, one of the ends 54a, 58a, 60a, or 62a being called the upstream end and the other end 54b, 58b, 60b, or 62b being called the downstream end. The downstream end 54b, 58b, 60B, 62b is situated at a distance from the fluid inlet opening 16 lying in the range 8.5 d to 16.2 d, and is equal, for example, to 16.2 d.

Figure 3:
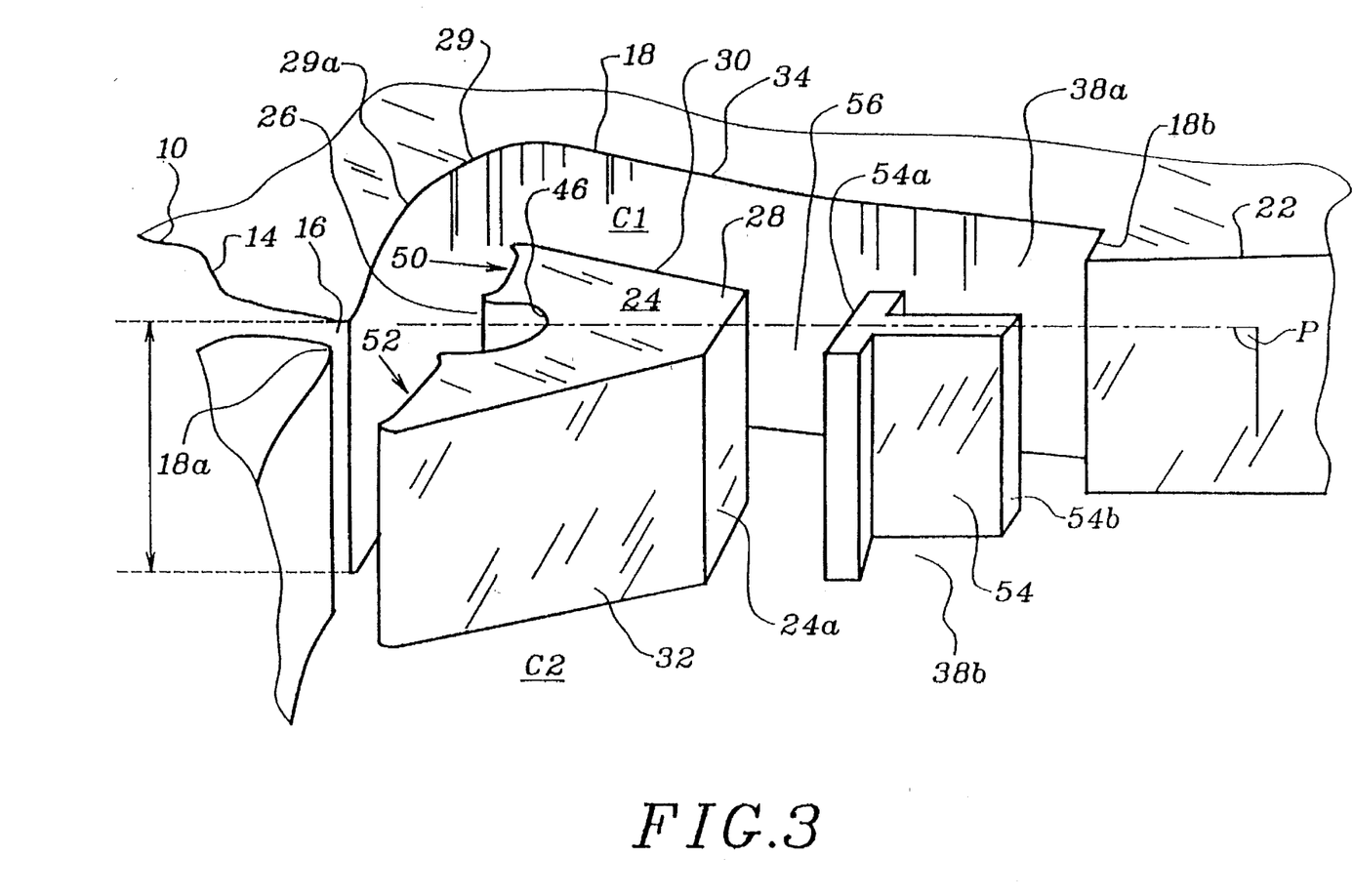
FIG. 3 is a fragmentary diagrammatic perspective view of the fluidic oscillator of FIG. 2.

In a first embodiment of the invention shown in FIGS. 2 and 3, the communication channel 56 is formed between the end 24a of the rear portion 28 of the obstacle 24 and the upstream end 54a of the longitudinal element 54. These two ends 24a and 54a in alignment on the plane of symmetry P define a longitudinal dimension of the communication channel 56 referred to as its "width", and they constitute the edges thereof.

The other longitudinal dimension of the communication channel 56, its "height", is the same as the height of the obstacle 24 and of the fluid inlet opening 16, i.e. h.

As shown in FIG. 3, the longitudinal element 54 as seen in section in the jet oscillation plane is generally T-shaped, the T lying on its side relative to the fluid flow direction and the horizontal bar of the T corresponding to the upstream end 54a of said longitudinal element 54, thereby constituting one of the edges of the communication channel.

This shape is advantageous because of the simplicity of its design. The shape of the flow section of the communication channel 26 is substantially rectangular and it extends in a direction perpendicular to the flow direction of the fluid. The width of the communication channel 56 lies in the range 0.5 d to 5 d, and is preferably equal to 1.8 d. The upstream end 54a of the longitudinal element must not be too far from the end 24a of the rear portion 28 of the obstacle 24 in order to ensure that the fluid flow coming from one of the passages C1 and C2 cannot switch from one zone to the other, thereby disturbing the formation of eddies. Nor must this upstream end 54a be too close to the obstacle 24 in order to avoid eliminating the phenomenon of fluid jet oscillation.

The distance between the fluid inlet opening 16 and the middle transverse plane through the communication channel 56 perpendicular to the plane of symmetry P and to the fluid flow direction lies in the range 7.5 d to 15 d, and is equal to 12.1 d, for example.

In addition, the transverse dimension of the communication channel 56 corresponding to its depth lies in the range 0.5 d to 5 d, and is equal to 2.4 d, for example. It is advantageous to have a longitudinal element 54 with an upstream end 54a of transverse size that is sufficiently large to prevent the fluid flow switching form one zone to the other.

Advantageously, the longitudinal element 54 is streamlined in shape so as to facilitate the flow of fluid over its side walls.

In addition, the edge 54a of the communication channel 56 constituted by the horizontal bar has a longitudinal size corresponding to its thickness which lies in the range 0.1 d to 4 d and is equal to 0.8 d, for example. It is also appropriate to reduce the transverse size of the longitudinal element 54 downstream from its upstream end 54a so as to limit headlosses. The size of the longitudinal element in the fluid flow direction lies in the range 0.5 d to 8.2 d, and is equal to 3.2 d, for example.

By providing a communication channel 56 in this way between the two zones 38a and 38b of the empty space 38 of the oscillation chamber 18, the fluid flow coming from one of the passages, e.g. C1, sets up a change in pressure at the communication channel 56 which gives rise to an increase in pressure in the other zone 38b that is more moderate than the increase that would otherwise be created in the absence of the longitudinal element 54. This moderate increase in pressure propagates in the other passage C2 in an upstream direction towards the eddies housed in the closer of the secondary cavities 52 to the flow passage C2, thereby enabling the fluid jet to switch to the other side without excessively disturbing the natural oscillation of the eddies. The invention thus makes it possible to reduce the coupling between the two flow passages C1 and C2, thereby reducing the interaction between the upstream and downstream ends of the fluidic oscillator 1, which interaction increases with increasing fluid flow rates.

Figure 4:
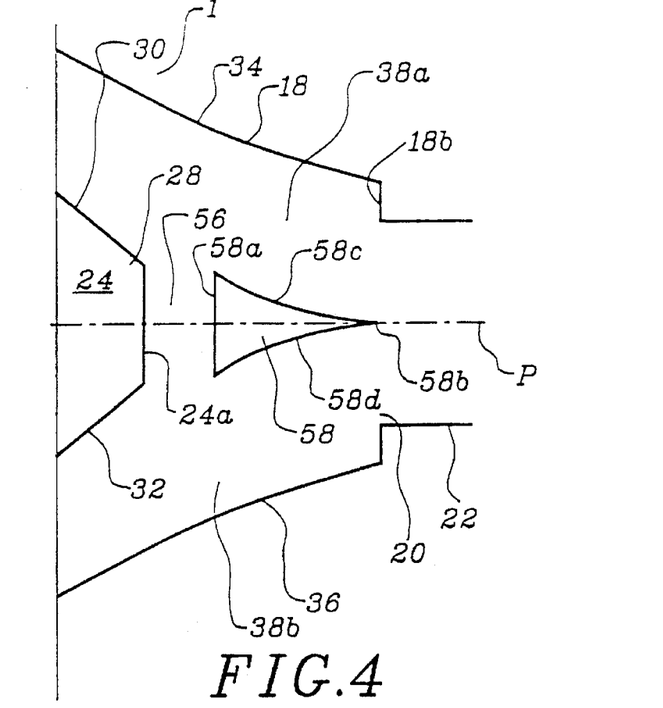
FIG. 4 is a fragmentary diagrammatic plan view of a variant embodiment of the rear portion of the FIG. 2 fluidic oscillator.
Figure 5:
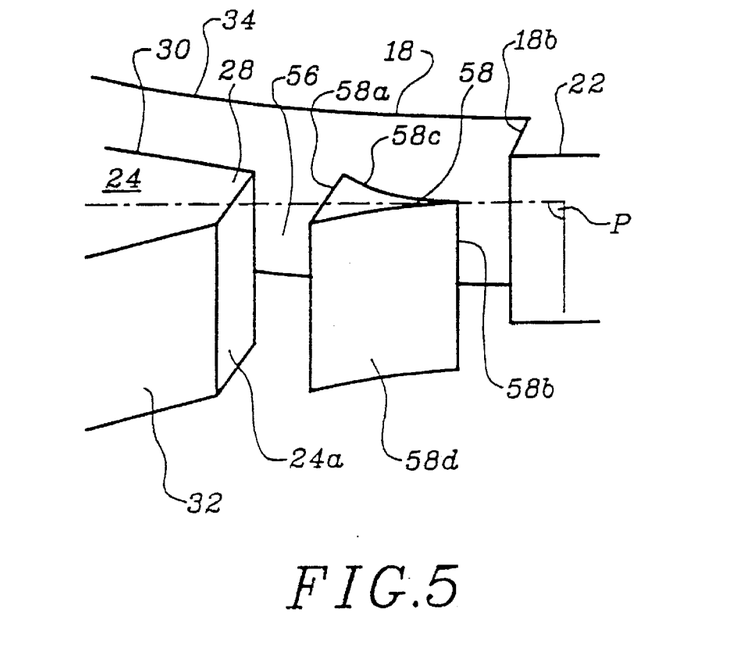
FIG. 5 is a diagrammatic perspective view of the FIG. 4 variant embodiment.

In a variant of the invention as shown in FIGS. 4 and 5, the longitudinal element 58 has a shape with two lateral faces 58c and 58d which extend from the upstream end 58a to the downstream end 58b. Each of these lateral faces 58c and 58d forms an identical and continuously decreasing angle relative to the plane of symmetry P. As can be seen in FIG. 4, the lateral faces 58c and 58d as seen in section in the oscillation plane of the jet are concave in shape.

In another variant of the invention as shown in FIGS. 6 and 7, the longitudinal element 60 when seen in section in the oscillation plane of the jet in FIG. 6 is substantially triangular in section the triangle being on its side relative to the flow direction of the fluid with its tip 60b constituting the downstream end of said longitudinal element.

In the variants described above, the width and the depth of the communication channel 56 and also the distance between the fluid inlet opening and the middle transverse plane are the same. The longitudinal element 54, 58, 60 of the invention has the same shape in all planes parallel to the oscillation plane of the fluid jet.

In a second embodiment of the invention, shown in FIG. 8, in which only the rear portion of the fluidic oscillator is shown, given that its front end is identical to that shown in FIG. 2, the longitudinal element forms a partition 62 which extends from its upstream end 62a that coincides with the end 24a of the rear portion 28 of the obstacle 24 all the way to its downstream end 62b.

The communication channel 64 is formed through the partition 62 and may have various different shapes. Thus, in FIG. 8, the flow section of the communication channel 64 is substantially rectangular and it extends perpendicularly to the fluid flow direction.

In a variant of the invention shown in FIG. 9, the communication channel 66 has a flow section that is substantially elliptical extending perpendicularly to the flow direction of the fluid.

In another variant of the invention, shown in FIG. 10, the flow channel 68 has a flow section that is oblong in shape, extending perpendicularly to the flow direction of the fluid.

The flow section of the communication channel must not vary excessively in different planes parallel to the plane of oscillation of the fluid jet in order to avoid disturbing the operation of the fluidic oscillator, and thus the measured rate of the fluid. The communication channel 64, 66, 68 as shown in FIGS. 8 to 10, has a longitudinal dimension or "width" lying in the range 0.5 d to 5 d, and equal to 1.8 d, for example, while its transverse dimension or "depth" lies in the range 0.5 d to 5 d, and is equal to 2.4 d, for example. The distance between the fluid inlet opening 16 and the middle transverse plane through the communication channel 64, 66, 68 lies in the range 7.5 d to 15 d, and is equal to 12.1 d, for example.

Advantageously, the portion of the partition 62 which is situated downstream from the communication channel may have a streamlined shape (not shown) to facilitate the flow of fluid over the lateral walls of said partition, and its transverse size may be relatively thin so as to limit headlosses in the fluid.

The characteristics and advantages mentioned in the description of the first embodiment of the invention apply equally to the above-described second embodiment.

Figure 13:
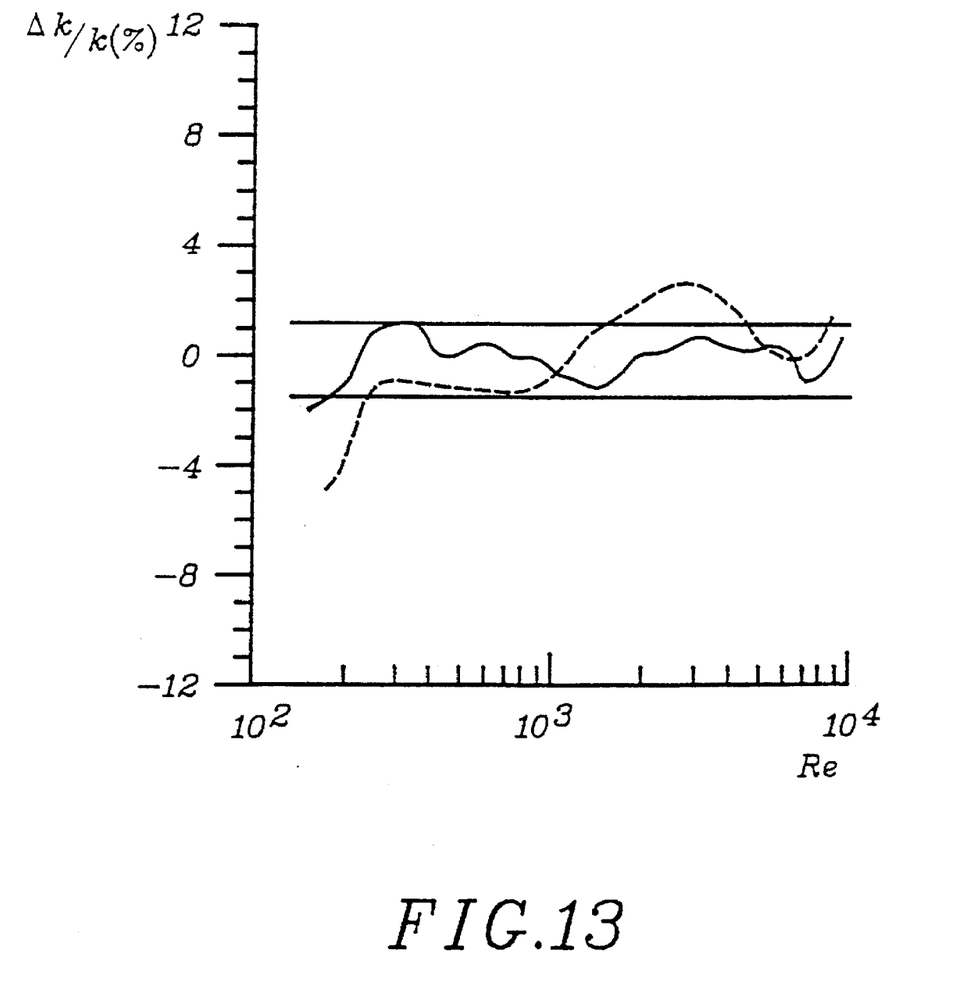
FIG. 13 shows relative variation in the factor K as a function of the Reynolds number Re for a fluidic oscillator of the invention (solid line) and for a fluidic oscillator of the prior art (dashed line).

FIG. 13 shows relative variation of the factor K as a function of Reynolds number Re for a fluidic oscillator of the invention, where such variation is represented by a solid line, and for a prior art fluidic oscillator, where such variation is represented by a dashed line.

It can be seen that the calibration curve of the fluidic oscillator of the invention remains within a range corresponding to relative variations in the factor K that are smaller than ±1.5%, which means that such a fluidic oscillator is linear compared with a prior art fluidic oscillator whose calibration curve has relative variations in the factor K that exceed ±1.5%. The oscillation frequency of such a fluidic oscillator of the invention can thus be increased under turbulent conditions.

The fluidic oscillator of FIG. 2 can be used to measure the flow rate of the fluid flowing through it by means of two pressure takeoffs 70 and 72 situated at the extreme points of the fluid jet sweep stroke within the main cavity 40. These pressure takeoffs are connected to known devices for measuring the oscillation frequency of the jet. By using prior calibration, this frequency is associated with flow rate. A commercial gas meter fitted with the fluidic oscillator of FIG. 2 is particularly advantageous since it presents linear behavior over a broad measurement range. Firstly it has means suitable for making the radial extent of the eddies depend on the flow conditions, thereby improving its linearity under laminar conditions and under transition conditions, and secondly it is provided with means for limiting the influence of the downstream fluid flow on the oscillation of the eddies, thereby particularly improving linearity under turbulent conditions.

The invention applies equally well to a fluidic oscillator in which the obstacle is not provided with secondary cavities.

I claim:

1. A fluidic oscillator that is symmetrical about a longitudinal plane of symmetry P, comprising:

means for generating a two-dimensional fluid jet that oscillates transversely relative to said longitudinal plane of symmetry P; and means for forming eddies on either side of said jet, and for enabling the fluid to flow towards the downstream end of the fluidic oscillator, said eddies being influenced by the downstream flow of the fluid, characterized in that said fluidic oscillator includes means for limiting the influence of the downstream flow of the fluid on the oscillation of the eddies.

2. A fluidic oscillator according to claim 1, comprising:

a fluid inlet having an inlet opening of width d suitable for forming an oscillating two-dimensional fluid jet;

an oscillation chamber connected via one of its ends to the fluid inlet opening and via its opposite end to a fluid outlet opening, the two openings being in alignment on the longitudinal plane of symmetry P, and having walls situated on either side of said plane P;

an obstacle disposed in said oscillating chamber and co-operating with the walls thereof to form passages to allow the fluid to flow towards the downstream end of the fluidic oscillator, said obstacle having a front portion in which a cavity is formed facing the fluid inlet opening, and a rear portion disposed facing the fluid outlet opening and having a rear end that co-operates with said fluid outlet opening to define an empty space into which said passages open out;

characterized in that the means for limiting the influence of the downstream flow of the fluid on the oscillation of the eddies comprise a longitudinal element disposed in line with the openings and at least in part in the empty space in such a manner as to partially subdivide it into two identical zones, forming between said zones at least one communication channel for the fluid, said communication channel having a middle flow section lying in the longitudinal plane of symmetry P.

3. A fluidic oscillator according to claim 2, characterized in that the longitudinal element has an "upstream" end and an opposite "downstream" situated at a distance from the fluid inlet opening lying in the range 8.5 d to 16.2 d.

4. A fluidic oscillator according to claim 3, characterized in that the communication channel is formed between the end of the rear portion of the obstacle and the upstream end of the longitudinal element, said ends constituting the edges of said communication channel.

5. A fluidic oscillator according to claim 4, characterized in that the longitudinal element is generally T-shaped with the horizontal bar of the T constituting one of the edges of the communication channel.

6. A fluidic oscillator according to claim 4, characterized in that the longitudinal element is of a shape having lateral faces extending from the upstream end to the downstream end, each forming the same continuously decreasing angle with the longitudinal plane of symmetry P.

7. A fluidic oscillator according to claim 4, characterized in that the longitudinal element is triangular in shape with the tip of the triangle constituting the downstream end.

8. A fluidic oscillator according to claim 3, characterized in that the longitudinal elements forms a partition extending from its upstream end which coincides with the downstream end of the rear portion of the obstacle to its own downstream end, the communication channel being formed through said partition.

9. A fluidic oscillator according to claim 8, characterized in that the communication channel has a flow section that is substantially rectangular in shape extending perpendicularly to the flow direction of the fluid.

10. A fluidic oscillator according to claim 8, characterized in that the communication channel has a flow section that is substantially elliptical in shape, extending perpendicularly to the flow direction of the fluid.

11. A fluidic oscillator according to claim 8, characterized in that the communication channel has a flow section that is substantially oblong in shape, extending perpendicularly to the flow direction of the fluid.

12. A fluidic oscillator according to claim 2, characterized in that the communication channel has a longitudinal dimension corresponding to its width and lying in the range 0.5 d to 5 d.

13. A fluidic oscillator claim 2, characterized in that the distance between the fluid inlet opening and the middle transverse plane of the communication channel lies in the range 7.5 d to 15 d.

14. A fluidic oscillator claim 2, characterized in that the communication channel has a transverse dimension lying in the range 0.5 d to 5 d.

15. A fluid flow meter characterized in that it includes a fluidic oscillator according to claim 1.

* * * * *